May 22, 1945. I. F. T. RIGBY 2,376,811
TYPE SIZE AND SPACE GAUGE
Filed May 27, 1943
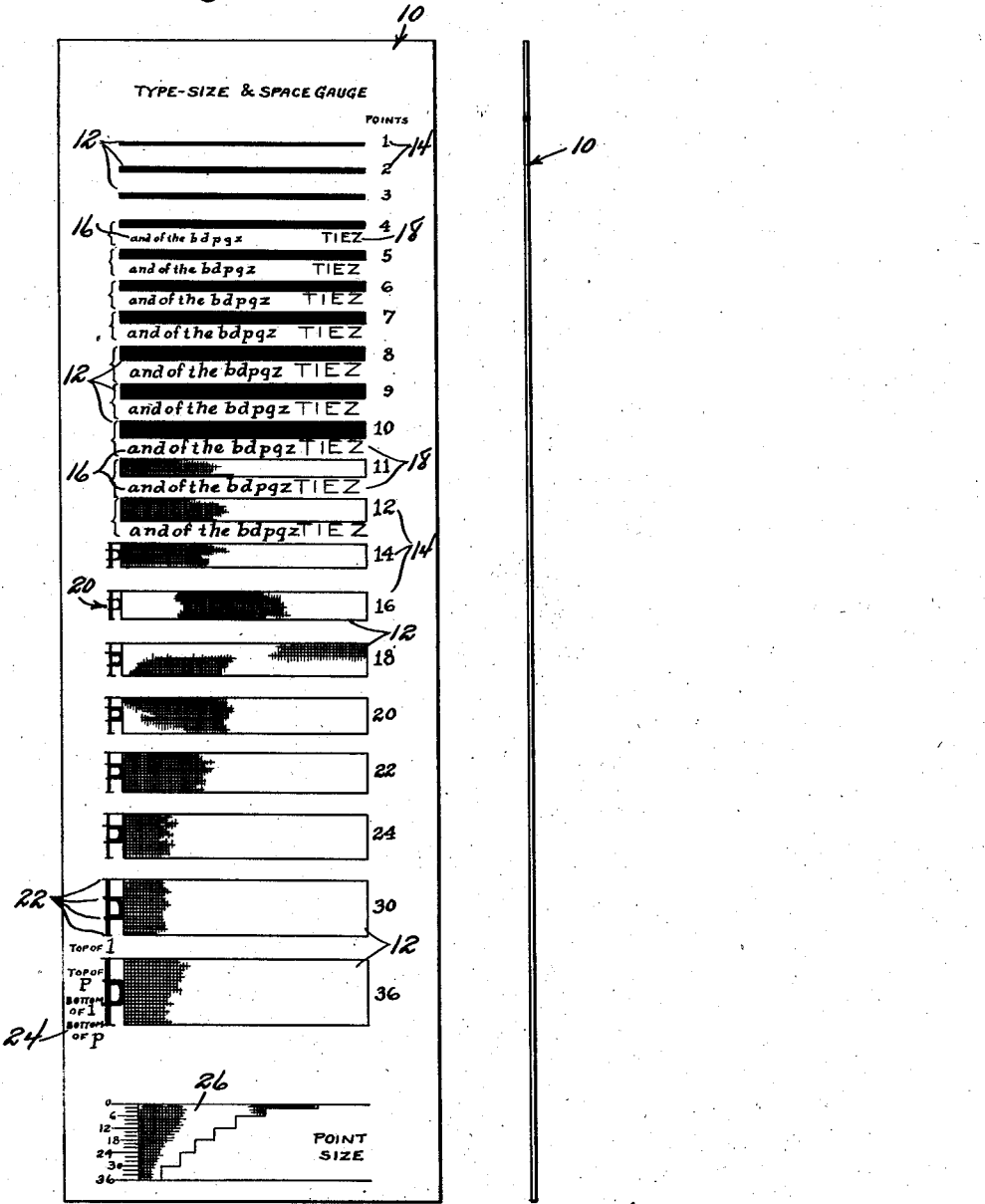
Irving F. T. Rigby INVENTOR.

Patented May 22, 1945

2,376,811

UNITED STATES PATENT OFFICE 2,376,811

TYPE SIZE AND SPACE GAUGE

Irving F. T. Rigby, Stamford, Conn.

Application May 27, 1943, Serial No. 488,785

1 Claim. (Cl. 33—1)

My invention relates to the measurement of printed matter based on the "point" system employed in the printing trade, particularly with respect to determining type sizes, spaces between lines, illustrations or other blank areas on a printed page, and has among its objects and advantages the provision of an improved type size and space gauge.

Most type matter for "test" or continuous reading is commonly "set" up in sizes ranging from four to twelve points, the larger sizes being generally used only for headings. The spaces between the lines vary from "solid" (no space between the lines) to as much as six or even eight points. The exact spacing is difficult to determine. While gauges have been devised for making such measurements, such gauges do not measure with that degree of accuracy and convenience essential in the trade. Most printers judge by eye, or by a series of difficult and time consuming measurements, which are usually uncertain when finished.

Accordingly an object of my invention is to provide a type size and space gauge so designed as to facilitate accurate and rapid measurements of type sizes and spaces.

In the accompanying drawing:

Figure 1 is a face view of the type size and space gauge, and

Figure 2 is an edge view.

In the embodiment of the invention selected for illustration, I make use of a strip 10 of transparent material, such as Celluloid. Transparent plastic is also suitable. The strip is preferably .030 of an inch in thickness. One face of the strip 10 is printed or otherwise provided with a plurality of measuring bars 12 of progressively wider proportions from the top to the bottom of the strip. A column of numbers 14 indicate the respective point widths of the bars 12. The bars 12 of the four through twelve point sizes are respectively provided with lower-case letters 16 and capital letters 18. The bottom of descending lower-case letters such as p, g or y terminate with the lower edges of their respective point bars 12. Ascending lower-case letters such as b, h, d, l, etc. terminate with the upper edges of their respective bars 12. The capital letters terminate with the top edges of their respective point bars 12, while the bottoms of the capital letters are in line with the bottoms of nondescending lower-case letters, for example, n, u, z, etc.

The bars 12 representing the fourteen through thirty-six point sizes are provided with symbols 20 to facilitate measurement of the alphabet, in addition to their spacing measuring function. These symbols 20 are provided with four indicating points or lines 22 respectively indicating from top to bottom of the symbols the top of an l, the top of a p, the bottom of the l, and the bottom of the p, as labeled at 24. Only the thirty-six point symbol need be labeled at 24, since this is the largest symbol, so that the reading is entirely legible.

At the extreme bottom of the strip 10 is arranged a point size gauge 26 which is helpful in determining spaces between parts of printed matter on a page, or small distances. The solid black lines are intended to show spacing between parts of a printed page, such as between illustration and its caption.

In operation, a preselected bar 12 is placed between any two printed lines. If it fits between the bottom of a p, g or y and the top of a b, h or l of the next or second line, the two lines are separated by a point or the number of points represented by the width of that bar. If the one point bar does not fit, the two lines are set "solid." If there is space, the next bar should be fitted and so on until the exact space is determined.

To determine type size, the gauge or strip 10 is placed over the printed page and the size and gauge is selected which matches exactly. Letters such as b, h, p, etc. and capitals should be employed for the sake of accuracy. Then the bar 12 associated with those letters is placed exactly over the printed line for additional checking as to accuracy. No part of the line on the printed page should project beyond the measuring bar, and neither should the solid black of the bar extend beyond the top of an l or the bottom of a p.

Each symbol 20 combines all four possible points of alignment. For example, the tops of ascending lower-case letters align with the top points 22; and the bottoms of the nondescending lower-case letters terminate with the third points from the top, which is also true of the bottoms of the capital letters. The only capital letter which extends the full distance is a capital Q, which has the tail hanging below.

Additional proof can be made by doubling the size of the type which has been determined, for example, six point then placing the twelve point bar over two lines of printed type. The two lines should fit perfectly beneath. If there is a two point space between the lines, they should be added, in which case the sixteen point bar should fit perfectly.

Without further elaboration, the foregoing will so fully explain my invention, that others may, by applying current knowledge, readily adapt the same for use under various conditions of service.

I claim:

A type size and space gauge, comprising a transparent strip, a space measuring bar on said strip, a symbol in the form of a composite of ascending and descending lower-case letters juxtapositioned with respect to an end of said bar, the top of the ascending letter being disposed in the plane of the top edge of the bar and the bottom of the descending letter in the plane of the bottom edge of said bar, a point width numeral indication at the opposite end of said bar, and indicating lines extending laterally from the tops and bottoms respectively of said letters.

IRVING F. T. RIGBY.